United States Patent [19]

Scibilia

[11] 3,924,940
[45] Dec. 9, 1975

[54] CASSETTE LIGHT SEAL FOR CAMERAS

[75] Inventor: Peter A. Scibilia, Westwood, Mass.

[73] Assignee: Polaroid Corporation, Cambridge, Mass.

[22] Filed: Jan. 2, 1974

[21] Appl. No.: 429,720

[52] U.S. Cl. ................................. 352/75; 352/72
[51] Int. Cl.² ........................................ G03B 23/02
[58] Field of Search .......... 352/72, 75, 76, 78, 202, 352/146, 148, 242; 353/97, 57, 58, 59, 60, 61; 354/174, 277

[56] References Cited
UNITED STATES PATENTS

| | | | |
|---|---|---|---|
| 3,017,804 | 6/1962 | Bonisch et al. | 352/72 |
| 3,359,877 | 12/1967 | Kitrosser | 354/277 |
| 3,604,790 | 9/1971 | Land | 352/78 R X |
| 3,792,919 | 2/1974 | Holmes | 352/78 R X |
| 3,807,841 | 4/1974 | Dudley | 352/72 |

Primary Examiner—Joseph F. Peters, Jr.
Assistant Examiner—Alan Mathews
Attorney, Agent, or Firm—David R. Thornton

[57] ABSTRACT

A light sealing arrangement for cameras of the type intended to be used with multipurpose film cassette having an air vent opening for use in processing and viewing a film strip contained in the cassette after exposure but which opening represents a potential source of light leakage during exposure of the film strip. The seal is positioned in the camera in a location to overlie the vent opening and thus provide a light shield or vent cover preventing any leakage of light through the vent. Structurally the light shield is a resilient pivotal member movable from a retracted position, allowing unobstructed insertion of the cassette into the camera, to an operative position in which the shield overlies the vent openings in the cassette.

12 Claims, 4 Drawing Figures

U.S. Patent  Dec. 9, 1975  3,924,940
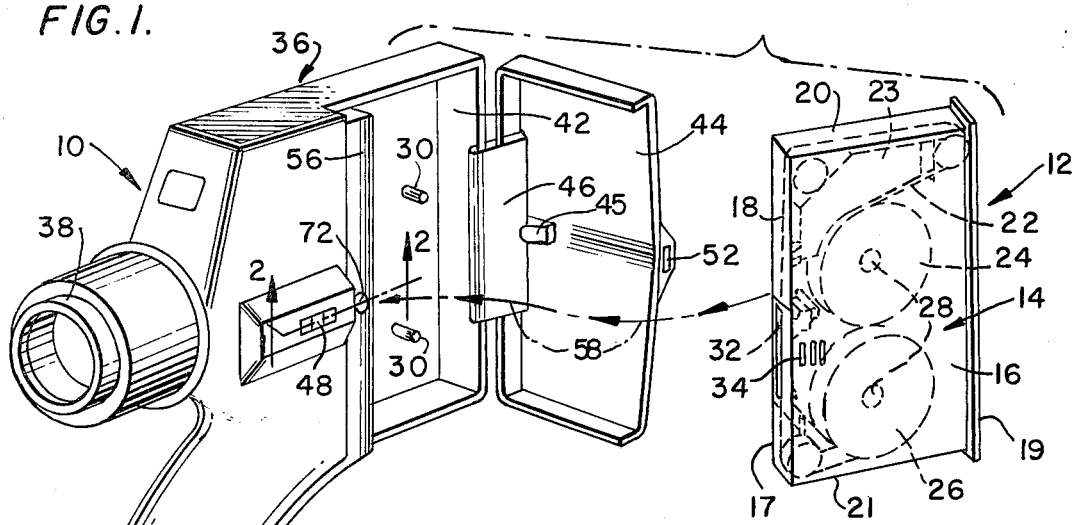
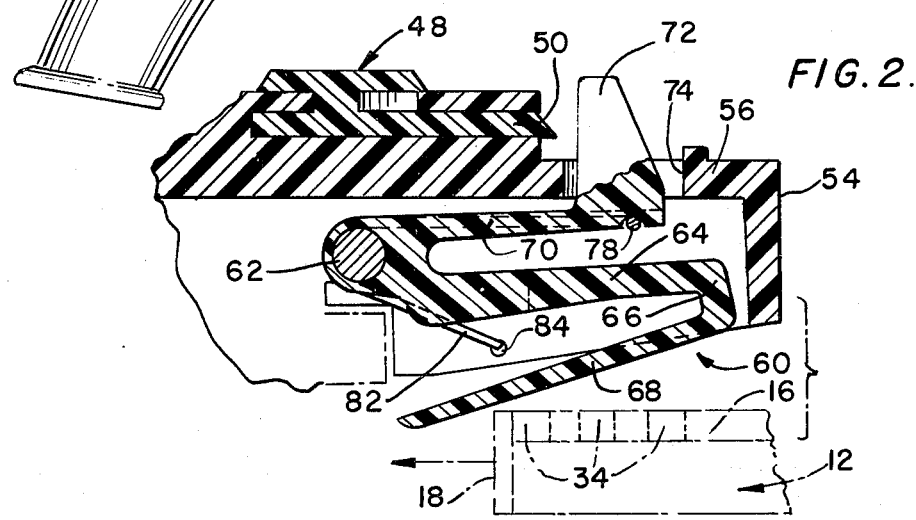
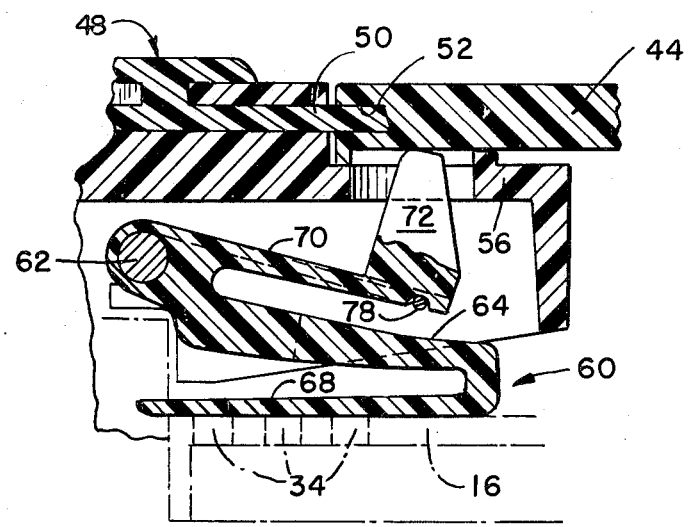
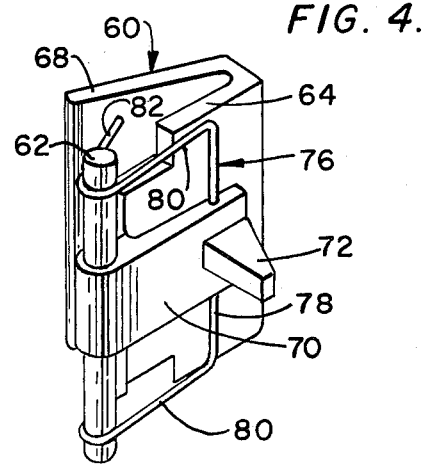

CASSETTE LIGHT SEAL FOR CAMERAS

BACKGROUND OF THE INVENTION

This invention relates to improvements in photographic cameras and more particularly, it concerns a novel light sealing organization for camera of the type adapted to receive multipurpose cassettes having air vent openings representing a potential source of light leakage and thus damage to cassette contained, photosensitive film during exposure through the object lens of the camera.

In recently developed motion picture photographic systems, a strip of photographic film contained in a cassette can be exposed in a camera adapted to receive the cassette and then processed to provide viewable images by placing the cassette in a viewing apparatus equipped to activate a cassette contained processor upon rewinding the exposed film strip. After processing in this manner, the viewing apparatus is operated as a projector to advance the film incrementally, frame by frame, past a light source so that the scene to which the film was exposed is reproduced in a manner well-known in the motion picture art. Exemplary disclosures of such recently developed photographic systems are found in U.S. Pat. No. 3,615,127 issued to Edwin H. Land on Oct. 26, 1971; U.S. Pat. No. 3,756,707 issued Sept. 4, 1973 to John R. Sharp; and in co-pending application by Peter A. Scibilia, entitled "Camera Aperture Plate Having Ramp and Bowed Pads"; Ser. No. 416,080, filed Nov. 15, 1973, all of which are assigned in common with the the present invention.

The film cassette employed in the aforementioned systems incorporates a relatively light-tight outer housing permanently enclosing the film strip together with supply and take-up spools between which the film strip is passed for exposure, processing and projection; a processor containing a supply of processing fluid; a light reflecting prism by which a light source in a viewing device may be projected through the film after processing; and other components incident to the basic exposing, processing and projecting operations. To enable circulation of air through the cassette interior for drying and cooling purposes during processing and projecting operations respectively, the cassette housing is provided with air vent openings in a side wall opposite the side wall through which the light reflecting prism is presented. Labrynth seals are provided in the cassette interior to preclude the passage of light through the air vents to the cassette interior and the film strip is provided with appropriate leaders so that there is no danger of damaging light leakage while the cassette is being handled prior to its insertion into a camera for exposure. Moreover, the camera is adapted to receive the cassette in such a way that the cassette housing opening, through which the film is exposed, is effectively sealed in the camera from all light except that permitted by normal camera shutter operation. However, because the light sensitive film passes in close proximity to the air vents during exposure in the camera, there is a potential for damaging light leakage particularly where high speed photosensitive emulsions are carried by the film strip. Although such light leakage might be precluded in some measure by conventional light seals in the camera door, potential imperfections in the door light seal as a result either of manufacturing imperfections or damage due to use justifies a need for an auxiliary light seal capacity in the region of the cassette air vents. In addition, the necessity for complete light seals in the door is mitigated substantially by the cassette itself with the exception of the vents for the reasons mentioned.

SUMMARY OF THE PRESENT INVENTION

In accordance with the present invention, a novel light shield is provided for cameras of the type used in photographic systems of the type aforementioned and by which the air vent opening of a multipurpose film cassette also employed in such systems is effectively covered to prevent leakage of light through the cassette air vent while the cassette is positioned in the camera. Preferably, the light shield is in the nature of an opaque plate-like member positioned to overlie and thus provide a positive light blockage covering the cassette air vent which is not used for air circulation during the time the cassette is located in the camera. In addition, the structure of the light shield is arranged so that it will not provide any obstruction whatsoever to insertion and removal of the cassette to and from the camera but will upon closure of a camera door, by yieldably biased into relatively firm contact with the side of the cassette in which the air vent is mounted.

Among the objects of the present invention are: the provision of a camera mounted light seal for vent openings in a film cassette adapted to be operably positioned in the camera and the correspondingly reduced need for a complete exterior light seal; the provision of such a light seal which is operative to effect a positive light sealing closure for the cassette air vent; the provision of such a light seal which does not in any way obstruct the insertion and removal of the cassette to and from the camera while at the same time facilitating a positive pressure bias between the light sealing sheild and the cassette vent opening; and the provision of such a light seal which is responsive to closure of a cassette chamber door of a camera.

Other objects and further scope of applicability of the present invention will become apparent from the detailed description to follow taken inn conjunction with the accompanying drawing in which like reference numerals designate like parts.

BRIEF DESCRIPTION OF THE DRAWING

FIG. 1 is a perspective view showing both a camera and a multipurpose film cassette in accordance with the present invention and prior to insertion of the latter into the former;

FIG. 2 is an enlarged fragmentary cross-section taken on line 2—2 of FIG. 1;

FIG. 3 is an enlarged fragmentary cross-section similar to FIG. 2 but illustrating the light shield of the present invention in a different condition during use; and FIG. 4 is a perspective view illustrating the light sealing shield component of the present invention.

DETAILED DESCRIPTION OF THE PREFERRED EMBODIMENT

In FIG. 1 of the drawing, a motion picture camera, generally designated by the reference numeral 10, is shown in a condition to receive a multipurpose film cassette 12 in accordance with the photographic systems exemplified by the patent references cited above. As illustrated particularly in U.S. Pat. No. 3,756,707, the cassette 12 is essentially a rectangular parallelepiped in configuration to include a pair of opposed parallel side walls 16 and 17, edge walls 18 and 19 and end walls 20 and 21. A film strip 22 is contained within the cassette 12 and connected at opposite ends to supply and take-up spools 24 and 26, respectively, each having splined drive sockets 28 to be engaged by splined shafts 30 in the camera. In its passage between the supply spool 24 and the take-up spool 26, the film strip 22 is trained in a path past an opening 32 in the leading edge wall 18 positioned to facilitate exposure of the film strip when operably received in the camera 10 and to facilitate the passage of projecting light through the film for viewing successive image frames formed on the film strip after exposure and processing. To enable the projection of light in this manner, a reflecting prism (not shown) is located behind the opening 32 and in the side wall 17 at the rear of the cassette in the position illustrated in FIG. 1. Directly opposite the prism and in the side wall 16, a vent opening 34 is provided. As discussed in the aforementioned U.S. Pat. No. 3,756,707, the air vent 34 enables the circulation of air through the cassette for cooling the prism and for drying the film strip 20 following operation of a cassette processor 23 during rewind of the film strip from the take-up spool 26 back to the supply spool 24 in a viewing apparatus (not shown) after exposure of the film strip in the camera 10. Much detail of the cassette is not shown in the drawing principally in the interest of a clear and concise illustration of the greater invention and secondarily because such details are fully disclosed in the aforementioned U.S. patent.

The camera 10 is also of conventional design to the extent that it includes a body 36 mounting an objective lens 38, a handle grip 40 and an internal drive and shutter mechanism (not shown) by which the film strip 22 may be advanced incrementally to expose successive frames to light images of objects or scenes formed by the lens in accordance with well-known motion picture photography. Also in this respect, reference is made to the aforementioned copending application Ser. No. 416,080 for a complete disclosure of the drive mechanism particularly suited for advancing the film strip 22 in a cassette of the design represented by the cassette 12 in FIG. 1 of the drawing.

The camera body 36 also provides a chamber 42 for receiving the cassette 12 in a manner such that the film strip will be engaged through the opening 32 by the internal drive mechanism of the camera (not shown) and also so that the drive shafts 30 will engage in the film spool sockets 28 of the cassette. The chamber 42 opens outwardly over its full vertical dimension and over the major portion of its width along the optical axis of the camera. A closure door 44 is pivoted on a hinge 46 secured at the rear end of the camera body and is adapted to swing between an open position as shown, to a closed position over the open outer side of the chamber 42. Mounted on the door member 44 is a spring 45 which provides means for holding the cassette in its operative position. A slidable latch 48 is provided with a latching pawl 50 adapted to engage in a catch 52 provided on the forward edge of the door 44.

The opening to the chamber 42 is established forwardly by an edge wall or lip 54 (illustrated in FIG. 2) joining at an exterior corner with a recessed abutment or jam wall 56 against which the door 44 is closed and latched. The wall portions 54 and 56 thus constitute a partial exterior wall for the chamber 42 along its forward edge such that the introduction of the cassette 12 into the chamber 42 entails a compound movement by which the leading edge 18 is first advanced inwardly and behind the wall portions 54 and 56 with subsequent swinging movement of the cassette inwardly against the drive shafts 30. The general movement of the cassette 12 during insertion thereof into the camera is depicted in FIG. 1 by the arrows 58. When the cassette is operatively positioned in the camera with the leading edge 18 of the cassette beneath the jam wall 56 etc., the exposure opening is enclosed in a substantially light tight condition, however, light leakage around the door opening, even when the door is in its closed position may reach the vent openings 34. Hence, because of the orientation of the cassette in the chamber 42 it will be appreciated that the air vent 34 thereof will be facing outwardly toward the wall portions 54 and 56 and the door 44, or be in a position to pass light which might leak around the latched edge of the door 44. Inasmuch as the location of the vent opening 34 is in close proximity to the light sensitive film strip in passing the aperture 32 during exposure, any light passing through the air vents is likely to effect unwanted damaging exposure of the film.

The manner in which the possibility of unwanted light leakage through the vent opening 34 in the cassette is prevented in accordance with the present invention may now be understood with reference to FIGS. 2–4 of the drawings. In these figures, a light seal is generally designated by the reference numeral 60 and shown to be a one piece molding of generally S-shaped cross-sectional configuration pivotally supported behind the camera body wall portion 56 by a pintle 62. An arm 64 extends from the pintle 62 rearwardly in relation to the camera body and connects through a reverse bend with the leading edge 66 of a forwardly extending plate-like shield member 68 adapted for orientation in either of a first condition illustrated in FIG. 2 or a second condition illustrated in FIG. 3 of the drawings. In the first condition, the plate-like shield member assumes an angular inclination in relation to the direction of final cassette movement on insertion so as to converge in relation to final movement of the cassette housing wall 16 in which the vent opening 34 is located. In this condition, the leading edge 68 of the shield will lie behind the edge wall 54 so that the cassette will move to its final operative position in the chamber 42 without obstruction from the shield member 68. In the second condition and as illustrated in FIG. 3, the shield member 68 is positioned to overlie and cover the vent openings 34 and thus be in essentially parallel relation to the outer cassette housing wall 16. To facilitate such orientation in either of the first or second conditions illustrated, the seal 60 is preferably formed of opaque and yieldably resilient synthetic resinous material though it is contemplated that various metals and other materials might also be used for the seal member 60. The change of conditions is further augmented by the pivotal movement afforded by the mount of the seal 60 on the pintle 62 in that the angle of convergence made by the shield member with respect to the cassette wall 16 in FIG. 2 is reduced by pivotal movement of the arm 64 between the positions illustrated in FIGS. 2 and 3. In accordance with the present invention, such pivotal movement is effected in substantial measure by closure of the door 44 against the wall portion jamb or wall portion 56 in the camera body. In this respect, the seal 60 is provided with a further arm extension 70 having a projecting lug 72 formed at the end thereof and adapted to project through an opening 74 in the wall portion 56. It will be apparent from FIGS. 2 and 3 of the drawing that closure of the door 44 after full insertion of the cassette 12 will cause the door to engage the lug 72 and move the seal so that the plate-like shield member 68 is held yieldably but firmly against the cassette housing wall 16 and overlying the vent opening 34. The seal member 60 is normally restrained to the position shown in FIG. 2 in which the lug 72 projects through the opening 74 by a U-shaped or double hair spring 76. As shown in FIGS. 2–4, the spring 76 includes a base portion or bale underlying the lug 72 having at opposite ends leg portions 80 extending in reverse bend fashion about the pintle 62 and terminating in end portions 82 adapted to lie against abutment formations 84 in the camera body wall structure.

Hence, it can be appreciated that cassette insertion in the chamber at least partly orients the light shield in its vent covering position, then closing of the door member completes movement of the shield to its final position. Consequently, the shield displacement between its position is responsive to operable positioning of the cassette in the camera, with the door closed and the camera-cassette combination ready for exposure.

Thus it will be seen that as a result of the present invention, an unique and highly effective light seal is provided for camera-cassette systems of the type described and by which the above-mentioned objectives are completely fulfilled. Also it will be appreciated by those skilled in the art that various modifications in the embodiment of the invention disclosed and illustrated herein may be made without departure from the invention. It is expressly intended, therefore, that the foregoing description is illustrative of a preferred embodiment only, not limiting, and that the true spirit and scope of the present invention be determined by reference to the appended claims.

What is claimed is:

1. In a photographic camera fr use with a film handling cassette configured for exposure of a cassette retained photographic film strip and for further operations relating thereto without removal of such film strip from the cassette, such cassette including a cassette housing having means defining first and second openings therein, such first opening configured for exposure and such second opening configured for such further operation, said camera comprising:

a camera body;
means for receiving such cassette in an operative relation with said camera body, said receiving means including means for providing a substantially light-tight enclosure around such first cassette opening;
selectively operable means for transmitting image carrying light rays along an exposure path extending through said enclosure means to such first cassette opening for performing exposure operations; and
independent means for light shielding such second cassette opening, said shielding means including a substantially opaque member and means on said camera body for supporting said member in a first position permitting substantially unobstructed insertion of such cassette into its operative position and for supporting said member in a second position biased against said cassette housing in covering relation to such second opening so as to substantially light seal such second opening during exposure operations.

2. The camera of claim 1 wherein such cassette housing includes a plurality of cassette housing walls with such first opening provided in a first of such cassette housing walls, such second opening provided in a second of such cassette housing walls, said receiving means including a chamber having an open end configured for insertion and removal of such cassette, such cassette being configured for operative location for exposure in said chamber with such second opening of such cassette facing said open end of said chamber, and said opaque member is pivotally mounted on said camera body for displacement between such first and second positions.

3. In a photographic camera having a body with a chamber to receive a multipurpose film cassette and a closure door movable between open and closed positions with respect to one side of the chamber to permit insertion and removal of the cassette when said door is open and operation of the camera to expose a cassette contained film strip when said door is closed, the cassette having a housing including an edge wall with an exposure opening therein and a side wall with an opening therein facing outwardly toward said one side of said chamber when the cassette is operatively positioned for exposure in said chamber, the improvement comprising independent means for light shielding the opening in the cassette side wall, said shielding means including a substantially opaque member and means on said camera body for supporting said member in a first position permitting substantially unobstructed insertion of the cassette into its operative position and in a second position biased against the cassette housing in covering relation to the opening of the cassette side wall so as to substantially light seal the opening in the cassette side wall during exposure operations.

4. The camera of claim 3 wherein said light shielding means includes means responsive to movement of said closure door between its said open and closed positions for displacing said opaque member between its said first and second positions.

5. In a photographic camera having a body with a chamber to receive a multipurpose film cassette and a closure door movable between open and closed positions with respect to one side of the chamber to permit insertion and removal of the cassette when said door is open and operation of said camera to expose a cassette contained film strip when said door is closed, the cassette having a housing including an edge wall with an exposure opening therein and a side wall with an opening therein facing outwardly toward said one side of the chamber when the cassette is operatively positioned for exposure in said chamber, the improvement comprising:

a light sealing shield comprising an opaque plate-like member;
means for supporting said plate-like member for orientation in a first position permitting substantially unobstructed insertion of the cassette into said chamber and for orientation in a second position biased yieldably against the cassette side wall and covering the opening therein, said supporting means including an arm supported at one end by the camera body and connected integrally at the other end thereof to said plate-like member to support said plate-like member yieldably inclined at a converging angle to the path traversed by the cassette side wall during cassette insertion thereby to establish said first position, said second position being achieved by movement of said plate-like member to an essentially parallel overlying relation with the cassette housing side wall and the opening therein.

6. The apparatus recited in claim 5 including pivotal means supporting said one end of said arm from the camera body so that the convergence of said shield with the cassette side wall is reduced upon pivotal movement of said arm toward the cassette in said chamber.

7. The apparatus recited in claim 6 including spring means normally restraining said arm in a pivotal position with a portion extending out of said chamber.

8. The apparatus recited in claim 7 wherein said portion is engageable by the door to move said arm against the normal restraint of said spring means and establish said second position of said shield.

9. In a motion picture camera having means for releasably receiving, in a secured enclosing arrangement, a film handling cassette which is provided with an elongated strip of unexposed film, means for providing access for image carrying light rays to progressive incremental sections of such film strip, and aperture means for facilitating another photographic operation utilizing such cassette and its retained film strip, said camera including lens means aligned with the access providing means of such cassette when it is operatively positioned in said receiving means, the improvement comprising:
a light sealing member; and
means for mounting said light sealing member for displacement between a first position wherein said light sealing member does not substantially preclude positioning of such cassette in an operative position in said receiving means and a second position where said member is engaged in light sealing arrangement with such cassette aperture means, the displacement of said light sealing member between its said first and its said second position being respectively automatically responsive to said camera operatively receiving such cassette in the said receiving means and the subsequent release of the cassette therefrom, said light sealing member being positioned in said chamber at a converging angle to the path of insertion of such cassette into said chamber and configured to engage such cassette during said insertion and to be in part displaced thereby between its said positions.

10. In a motion picture camera having means for releasably receiving, in a secured enclosing arrangement, a film handling cassette which is provided with an elongated strip of unexposed film, the cassette including means for providing access for image carrying light rays to progressive incremental sections of the film strip and aperture means for facilitating another photographic operation utilizing the cassette and its retained film strip, said camera including lens means aligned with the access providing means when the cassette is operatively positioned in said receiving means, said receiving means comprising a receiving chamber including a door member displaceable between an open position permitting access to said chamber for insertion therein or removal therefrom of the cassette, the improvement comprising:
a light sealing member; and
means for mounting said light sealing member for displacement between a first position wherein said light sealing member does not substantially preclude positioning of such cassette in an operative position in said receiving means and a second position where said member is engaged in light sealing arrangement with such cassette aperture means, the displacement of said light sealing member between its said first and its said second position being respectively automatically responsive to said camera operatively receiving such cassette in the said receiving means and the subsequent release of the cassette therefrom, and said displacement of said light sealing member between its said first and second position is respectively responsive in part to closing and opening of said door member.

11. The camera of claim 10 wherein said aperture means comprises an opening in a side wall of said cassette, said light sealing member comprises an opaque plate-like member, and said camera further including means supporting said plate-like member for orientation in a first position permitting substantially unobstructed insertion of the cassette into said chamber and for orientation in a second position biased yieldably against the cassette side wall and covering the opening therein.

12. The camera of claim 11 wherein said light sealing member is pivotally mounted in said camera and includes a lug member configured to engage said door member during closing thereof for displacement of said light sealing member between its said positions.

* * * * *